(12) United States Patent  
Bartosik

(10) Patent No.: US 7,174,296 B2  
(45) Date of Patent: Feb. 6, 2007

(54) TRANSCRIPTION SERVICE STOPPING AUTOMATIC TRANSCRIPTION

(75) Inventor: Heinrich Franz Bartosik, Vienna (AU)

(73) Assignee: Koninklijke Philips Electronics N.V., Eindhoven (NL)

(*) Notice: Subject to any disclaimer, the term of this patent is extended or adjusted under 35 U.S.C. 154(b) by 874 days.

(21) Appl. No.: 10/258,048

(22) PCT Filed: Mar. 13, 2002

(86) PCT No.: PCT/IB02/00769

§ 371 (c)(1),
(2), (4) Date: Oct. 18, 2002

(87) PCT Pub. No.: WO02/075724

PCT Pub. Date: Sep. 26, 2002

(65) Prior Publication Data

US 2003/0125951 A1 Jul. 3, 2003

(51) Int. Cl.
*G10L 15/26* (2006.01)
(52) U.S. Cl. .................. 704/260; 704/270
(58) Field of Classification Search .................. None
See application file for complete search history.

(56) References Cited

U.S. PATENT DOCUMENTS 6,122,614 A * 9/2000 Kahn et al. ............ 704/235
6,446,041 B1 * 9/2002 Reynar et al. .......... 704/260
7,006,967 B1 * 2/2006 Kahn et al. ............ 704/235

FOREIGN PATENT DOCUMENTS

WO  WO0046787  10/2000

* cited by examiner

*Primary Examiner*—Susan McFadden

(57) ABSTRACT

A transcription system including a transcription device for the automatic transcription of dictated material and additionally employs transcribers who manually transcribe some of the dictated material. The transcription device contains an abortion unit for aborting processing of certain dictated material by the transcription device and retransmitting this dictated material to one of the transcribers for manual transcription if the quality of the dictated audio data (AI) or the quality of the automatically transcribed text data (ATTI) is so poor that the correction of recognition errors in the automatically transcribed text data (ATTI) requires more effort than if said dictated material is transcribed manually from the outset.

14 Claims, 1 Drawing Sheet

TRANSCRIPTION SERVICE STOPPING AUTOMATIC TRANSCRIPTION

Figure 1:
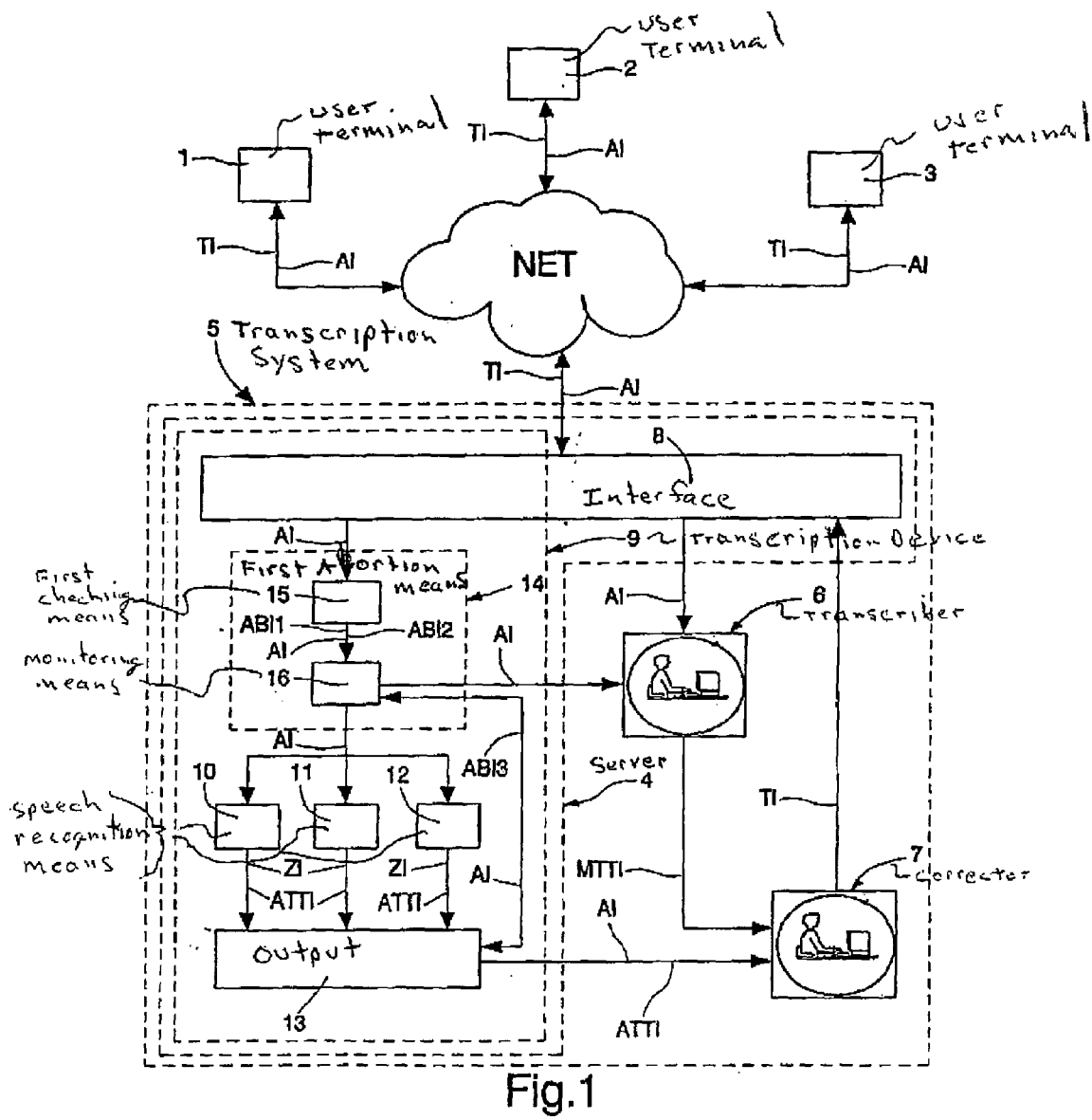

The invention relates to a transcription device, to which dictated audio data may be supplied and which is designed to output text data automatically associated with this audio data by means of speech recognition software of the transcription device.

The invention further relates to a transcription method in which dictated audio data may be received and which is designed to output text data automatically associated with this audio data during execution of the transcription method.

The invention further relates to a computer software product which takes the form of the speech recognition software run by the transcription device.

Document WO 00/46787 discloses a transcription service for substantially automatic transcription of dictated material, in which a transcription device as claimed in the first paragraph executes a transcription method according to the second paragraph. A user of the known system may send his/her dictated audio data in the form of digital audio data via a data network to the transcription device, which takes the form of a server.

When the user makes use of the transcription service for the first time, the user's dictated material is transcribed manually by an employee of the transcription service (a transcriber). Another employee of the transcription service (a corrector) checks the text transcribed by the transcriber and edits any errors contained therein. The text data transcribed manually by the transcription service from the user's dictated material is then sent to the user together with an invoice.

The known transcription device operates speech recognition software which is adapted to the user of the transcription service, wherein user references are stored. The quality of the text data recognized automatically by the transcription device depends essentially on how well the speech recognition software has so far been trained to the user. The known transcription device uses the audio data from the user's dictated material together with the manually transcribed text data to train the speech recognition software and store improved user references.

When the user has made frequent use of the transcription service, the his dictated audio data is additionally supplied to the transcription device for automatic transcription. The text data then transcribed automatically by the transcription device is subsequently compared with the manually transcribed text data by the corrector. If relatively few recognition errors are contained in the automatically transcribed text data, the dictated material received in future from this user is firstly transcribed automatically by the transcription device and then corrected manually by the corrector. User settings are stored with the transcription service, which settings determine in which manner the dictated material of a given user is transcribed.

The known transcription service further provides the option of a system administrator changing these user settings for a limited period in such a way that dictated material from the user is solely transcribed manually, even though automatic transcription has already achieved a relative low number of recognition errors in automatically transcribed text data. This change to the user setting is performed by the system administrator when he is informed that the user is ill or has had dental treatment, a fact which would lead to the achievement by automatic transcription of a poorer recognition rate due to a change in the user's pronunciation.

A disadvantage of the known transcription service has proven to be that, in the case of automatic transcription by the transcription device, the automatically recognized text data sometimes contains a very large number of recognition errors, whereby the corrector has to spend a lot of time correcting the recognition errors.

It is an object of the invention to provide a transcription device of the type indicated in the first paragraph, a transcription method of the type indicated in the second paragraph and a computer software product of the type indicated in the third paragraph, with which the above-mentioned disadvantages are avoided.

To achieve the above-mentioned object, features according to the invention are provided for such a transcription device, such that the transcription device may be characterized in the following way:

A transcription device for the automatic transcription of dictated material, having receiving means for receiving dictated audio data and having speech recognition means for converting the received audio data into automatically transcribed text data and having output means for outputting the automatically transcribed text data and having abortion means for aborting processing of the dictated material by the transcription device if automatic transcription by the speech recognition means would produce or has already produced poor quality automatically transcribed text data with a relatively large number of recognition errors.

To achieve the above-mentioned object, features according to the invention are provided for such a transcription method, such that the transcription method may be characterized in the following way:

A transcription method for the automatic transcription of dictated material, wherein the following steps are executed:
reception of dictated audio data;
conversion of the received audio data into automatically transcribed text data;
output of the automatically transcribed text data;
abortion of processing of the dictated material if the automatically transcribed text data produced during automatic transcription would be or already is of poor quality with a relatively large number of recognition errors.

To achieve the above-mentioned object, features according to the invention are provided for such a computer software product, such that the computer software product may be characterized in the following way:

A computer software product, which may be loaded directly into the internal memory of a digital computer and comprises portions of software code, wherein the steps of the transcription method as claimed in claim 8 are executed by the computer if the product is running on the computer.

In this way, the advantage is achieved that, according to the transcription method, the transcription device aborts processing of the user's dictated material automatically of its own accord if it is certain that the text data still to be automatically transcribed or the text data already automatically transcribed will comprise or already comprises so many recognition errors that a corrector would have to spend more time editing these errors than would be required for the transcriber to transcribe the dictated material manually from the outset. In this way, ultimately unsuccessful automatic transcription of problematic dictated material is aborted automatically as soon as possible. The transcriber's and corrector's working time is thus advantageously used more effectively and in addition computing capacity of the server running the computer software product is also saved.

According to the measures contained in claim 2, the advantage is obtained that the transcription device checks the quality of the received dictated audio data and thus decides before actual automatic transcription using the speech recognition means whether successful automatic transcription is at all possible with said audio data.

According to the measures contained in claim 3, claim 4, claim 5, claim 9 and claim 10, the advantage is obtained that meaningful indices of the quality of the dictated audio data for subsequent speech recognition are determined. On the basis of these indices, a sound decision may be made about continuing with or aborting processing of the dictated material with the transcription device.

According to the measures of claim 6 and claim 11, the number of probably incorrectly recognized words in the automatically transcribed text data is related to the number of all the words in the automatically transcribed text data on the basis of a "confidence measure" determined by the transcription device. If this calculation produces an error rate below an error threshold, processing using the transcription device is aborted and the automatically transcribed text data is not fed to the corrector.

According to the measures of claim 7 and claim 12, the advantage is obtained that problematic dictated audio data is retransmitted by the transcription device immediately after processing by the transcription device is aborted, in order to allow manual transcription.

The invention will be further described with reference to examples of embodiments shown in the drawings, to which, however, the invention is not restricted.

FIG. 1 shows a transcription system, to which a user may send dictated audio data, whereupon he receives from the transcription system text data transcribed from the dictated material and an invoice.

FIG. 1 shows user terminals 1, 2 and 3, which are connected via the Internet NET with a server 4 of a transcription system 5. The user terminal 1 takes the form of a computer to which a microphone is connected. A computer user may dictate material into the microphone, this then being stored on the hard disk of the computer as digital audio data by sound recorder software run on the computer. The digital audio data may be transmitted by the computer to the server 4 as audio data AI. The audio data AI in each case also contains a further sequence of user information, which identifies the user.

The user terminal 2 takes the form of a telephone and a computer. A user of the user terminal 2 may use the telephone to call the server 4 via the Internet NET and dictate material into the telephone, which is transmitted to the server 4 as audio data AI.

The user terminal 3 takes the form of a digital dictating machine and a computer. The user of the user terminal 3 may use the dictating machine to record dictated material as digital audio data and copy it onto a computer hard disk at a later time. The digital audio data may be transmitted by the computer to the server 4 as audio data AI.

Dictated audio data AI transmitted to the server 4 may be transcribed using the transcription system 5, i.e. converted into transcribed text data TI. The text data TI transcribed by the transcription system 5 is then transmitted by the server 4 to the computer associated with the user terminal 1, 2 or 3 by which the audio data AI was received. The transcribed text data TI received by the user terminal 1, 2 or 3 is finally displayed to the user by the computer associated with the respective user terminal 1, 2 or 3, a feature which will be discussed in more detail below.

Audio data AI fed to the server 4 may be transcribed both manually and automatically. Manual transcription is performed by a plurality of employees of the transcription system 5 (so-called transcribers), which are illustrated symbolically as transcriber 6. In the case of manual transcription, the transcriber 6 listens to the dictated audio data AI and simultaneously writes the spoken text down by computer in the form of manually transcribed text data MTTI, as has long been known.

Other employees of the transcription system 5 (so-called correctors, symbolically illustrated as corrector 7) receive the manually transcribed text data MTTI from the transcriber 6, together with the associated dictated audio data AI. The corrector 7 again listens to the dictated audio data AI, checks the manually transcribed text data MTTI for transcription errors and corrects any transcription errors found. The manually transcribed text data MTTI checked by the corrector 7 is fed as transcribed text data TI to the server 4 and thence to the respective user device 1, 2 or 3.

The server 4 comprises interface means 8, which take the form of a software module run by the server 4 and a modem. The interface means 8 are designed to receive the audio data AI from the user devices 1, 2 and 3 and to retransmit the received audio data AI to the transcriber 6. The corrector 7 feeds the transcribed text data TI to the interface means 8, which transmits it to the correct user device 1, 2 or 3.

The server 4 additionally comprises a transcription device 9 for automatic transcription of the dictated audio data AI in accordance with a transcription method. For this purpose, the transcription device 9 runs speech recognition software constituting a computer software product. An example of such speech recognition software is that sold by Philips under the name of "Speech Magic".

The transcription device 9 comprises receiving means for receiving dictated audio data, which receiving means take the form of the interface means 8. The transcription device 9 further comprises three speech recognition means 10, 11 and 12, which are designed to convert the received audio data AI into automatically transcribed text data ATTI. The server 4 runs the speech recognition software three times in parallel, forming the three speech recognition means 10, 11 and 12. In this way, audio data AI from three batches of dictated material may be processed in parallel and the processing capacity of the transcription device 3 may be increased.

The transcription device 9 further comprises output means 13, to which the automatically transcribed text data ATTI may be fed by the speech recognition means 10, 11 and 12. The output means 13 are designed to feed dictated audio material AI together with the text data ATTI automatically transcribed by one of the speech recognition means 10, 11 or 12 to the corrector 7. The corrector 7 again listens to the dictated audio data AI, checks the automatically transcribed text data ATTI for transcription errors and corrects them.

A transcription system 5 such as that described above is known from the document WO 00/46787, the disclosure of which is deemed by virtue of this reference to constitute part of the disclosure of this document. The interface means 8 feed the audio data AI to be transcribed either to the transcriber 6 for manual transcription or to the transcription device 9 for automatic transcription. In this respect, consideration is given to how often a user has already used the transcription system 5, as described in document WO 00/46787.

The transcription device 9 comprises abortion means for aborting processing of dictated audio data AI by the transcription device 9 if automatic transcription by the speech recognition means 10, 11 or 12 would produce or has already produced poor quality automatically transcribed text data ATTI with a relatively large number of recognition errors. First abortion means 14 of the transcription device 9 are designed to check the quality of the received audio data AI for downstream speech recognition by the speech recognition means 10, 11 or 12 and to abort processing of the dictated material by the transcription device 9 if the quality of the received audio data AI does not allow successful automatic transcription.

The first abortion means 14 contain first checking means 15 and monitoring means 16. The first checking means 15 comprise an analog/digital converter, with which the audio data AI received in the form of digital audio data is converted into an analog audio signal. The first checking means 15 are designed, as a first check, to check the signal-to-noise ratio of the analog audio signal, as is generally known. The first checking means 15 are designed, as a second check, to check the level of the analog audio signal, as is also generally known.

If, during the first check, the first checking means 15 find that the signal-to-noise ratio of the analog audio signal is poorer than an S/N threshold (e.g. S/N threshold=20 dB), the first checking means 15 are designed to feed a first abortion signal ABI1 to the monitoring means 16. If, during the second check, the first checking means 15 find that the level of the analog audio signal is poorer than a level threshold (e.g. level threshold=−30 dB), the first checking means 15 are designed to feed a second abortion signal ABI2 to the monitoring means 16. In addition, the audio data AI checked by the first checking means 15 is retransmitted to the monitoring means 16.

If, as a result of the checks, the first checking means 15 feed neither the first abortion signal ABI1 nor the second abortion signal ABI2 to the monitoring means 16, the monitoring means 16 are designed to retransmit the audio data AI to one of the speech recognition means 10, 11 or 12 which is currently available.

In this way, the advantage is achieved that the transcription device 9 performs automatic transcription of the dictated audio data AI if the quality of the received audio data AI is sufficiently good for downstream speech recognition by the speech recognition means 10, 11 or 12. Thus, the computing capacity of the server 4 is advantageously put to optimum use, since only that dictated material is transcribed whose audio data AI is of good quality.

If on the other hand, as a result of the checks, the first checking means 15 feed the first abortion signal ABI1 and/or the second abortion signal ABI2 to the monitoring means 16, the monitoring means 16 are designed to retransmit the audio data AI to the transcriber 6. In this respect, the monitoring means 16 constitute retransmission means.

In this way, the advantage is achieved that the transcription device 9 does not perform any automatic transcription of the dictated audio data AI at all and initiates manual transcription, if the quality of the received audio data AI is insufficiently good for downstream speech recognition by the speech recognition means 10, 11 or 12. In this respect, it is particularly advantageous that the monitoring means 16 straight away retransmits such dictated audio data AI automatically to the transcriber 6 for manual transcription.

In the event of conversion of the audio data AI into automatically transcribed text data ATTI, the speech recognition means 10, 11 and 12 are designed to determine a so-called "confidence measure" for each word of the automatically transcribed text data ATTI, as has long been known to the person skilled in the art. The "confidence measure" of a word is a probability value, which indicates the probability of this word having been recognized correctly by the speech recognition means 10, 11 or 12. The speech recognition means 10, 11 and 12 are designed to supply a reliability signal ZI to the output means 13, which gives the "confidence measure" for each word of the automatically transcribed text data ATTI.

The output means 13 of the transcription device 9 further constitute second checking means, which are designed to perform a third check. In the third check, the second checking means check what number K of words of the automatically transcribed text data ATTI exhibit a lower probability value than a threshold probability value (e.g. threshold probability value=50%).

If this number K of recognition errors per N words of the automatically transcribed text data ATTI is greater than an error threshold (e.g. error threshold value=20%), the second checking means are designed to feed a third abortion signal ABI3 to the monitoring means 16. In this respect, the third checking means of the output means 13, together with the monitoring means 16, form second abortion means. If the monitoring means 16 receive the third abortion signal ABI3, the monitoring means 16 are designed to supply this dictated audio data AI to the transcriber 6.

In this way, the advantage is achieved that automatically transcribed text data ATTI containing large numbers of recognition errors is not output to the corrector 7, because the corrector 7 would in this case need substantially more time to make the necessary corrections than if the transcriber 6 were to transcribe said dictated material manually from the outset.

The advantages of the transcription device 9 according to the invention will now be explained in more detail below with reference to three examples of application. According to the first example of application, it is assumed that a doctor has already made frequent use of the transcription service provided by the transcription system 5. The speech recognition means 10, 11 and 12 therefore contain stored user references for the doctor determined from dictated audio data AI which has already been transcribed. The speech recognition means 10, 11 and 12 are already capable of producing automatically transcribed text data ATTI with very few recognition errors from material dictated by the doctor.

The doctor uses his user terminal 2, wherein he dictates material into the telephone after calling the server 4 by telephone and identifying himself. On this occasion, however, the doctor forgets to close his surgery window, for which reason street noise is superimposed on the dictated audio data AI.

Since this doctor's dictated material has already frequently been successfully transcribed automatically by the transcription device 9, the interface means 8 forward the received audio data AI to the first checking means 15. The first checking means 15 establish with the first check that the signal-to-noise ratio of the audio signal containing the audio data AI is too poor for automatically transcribed text data ATTI with an acceptable level of recognition errors to be obtained with automatic transcription using one of the speech recognition means 10, 11 or 12, and feed the first abortion signal ABI1 to the monitoring means 16. With the second check, the first checking means 15 establish that the level of the audio signal containing the audio data AI is sufficiently good and do not therefore feed the second abortion signal ABI2 to the monitoring means 16.

The first abortion means 14 are advantageously designed to abort processing of the dictated material by the transcription device 9 before the speech recognition means 10, 11 or 12 have started automatic transcription of the audio data AI. On this occasion, the monitoring means 16 retransmit the received audio data AI to the transcriber 6 for manual transcription after receipt of the first abortion signal ABI1. The transcriber 6 may thus manually transcribe this dictated material, which is superimposed with street noise and therefore difficult to transcribe, and then send it to the corrector 7.

It thus proved possible advantageously to minimize the total manual and thus cost-intensive work performed by the transcriber 6 and the corrector 7 in relation to this dictated material, since the corrector 7 would have taken a very long time to edit the automatically transcribed text data ATTI.

According to the second example of application, it is assumed that the doctor is dictating another item relatively quietly, since a patient is asleep in his/her surgery. With its second check of the audio data AI of this further dictated item, the first checking means 15 establish that the level of the audio signal containing the audio data AI is lower than the level threshold and feed the second abortion signal ABI2 to the monitoring means 16. The first abortion means 14 thereupon abort processing of said further dictated item before automatic transcription, whereby the above-listed advantages are obtained.

According to the third example of application, it is assumed that the doctor is dictating another item and transmitting it to the transcription system 5 for transcription. This further dictated item is also retransmitted to the transcription device 9 by the interface means 8. Since the quality of this dictated audio data AI is sufficiently good, the first checking means feed neither the first abortion signal ABI1 nor the second abortion signal ABI2 to the monitoring means 16.

The second speech recognition means 11 thereupon transcribe this further dictated audio data AI, wherein the text data ATTI automatically transcribed by the second speech recognition means 11 exhibit a number of recognition errors per 100 words of automatically transcribed text data ATTI which exceeds the error threshold. This is because the doctor was hoarse when dictating and his/her pronunciation was different from usual.

The third checking means of the output means 13 automatically observe that the number of recognition errors exceeds the error threshold when performing their third check and thereupon feed the third abortion signal ABI3 to the monitoring means 16. The monitoring means 16 thereupon retransmit this further dictated audio data AI to the transcriber 6, whereby the above-listed advantages are obtained.

It may be mentioned that a transcription device according to the invention may comprise further checking means for checking the received audio data and for checking the quality of intermediate results or the end result of automatic transcription. On the basis of these checks, the abortion means decide whether it is advantageous to abort processing of the dictated material by the transcription device.

It may be mentioned that abortion means according to the invention may also be provided in a transcription device providing online transcription.

It may be mentioned that the corrector usually only performs spot checks on manually transcribed text data MTTI.

It may be mentioned that the speech recognition means may likewise comprise abortion means, which compare the quality of text data transcribed automatically from audio data with the error threshold, for example after performing transcription of this received audio data for 20 seconds, and optionally abort processing. This would allow the advantage to be obtained that processing of the received audio data may also be aborted during automatic transcription.

It may be mentioned that the first abortion means may also be designed to check the received audio data for non-linear distortions. Such non-linear distortions occur for example when the audio signal has been overridden or when problems have arisen during compression or decompression of audio data. Since the recognition rate of the speech recognition means is poorer if the received audio data exhibit non-linear distortions, abortion of processing of the audio data is advantageous if the non-linear distortions are too strong.

The invention claimed is:

1. A transcription device for the automatic transcription of dictated material, comprising:
   receiving means for receiving dictated audio data (AI);
   speech recognition means for converting the received audio data (AT) into automatically transcribed text data (ATTI);
   output means for outputting the automatically transcribed text data (ATTI); and
   abortion means for aborting processing of the dictated material by the transcription device if automatic transcription by the speech recognition means would produce or has already produced poor quality automatically transcribed text data (ATTI) with a relatively large number of recognition errors.

2. A transcription device as claimed in claim 1, in which the abortion means are designed to check the quality of the received audio data (AI) for downstream speech recognition by the speech recognition means and to abort processing of the dictated material by the transcription device if the quality of the received audio data (AI) does not allow successful automatic transcription.

3. A transcription device as claimed in claim 2, in which the abortion means are designed to check the signal-to-noise ratio of an audio signal containing the received audio data (AI).

4. A transcription device as claimed in claim 2, in which the abortion means are designed to check the level of the audio signal containing the received audio data (AI).

5. A transcription device as claimed in claim 2, in which the abortion means are designed to check whether the audio signal containing the received audio data has non-linear distortions.

6. A transcription device as claimed in claim 1, in which the abortion means are designed to check the quality of the automatically transcribed text data (ATTI) and to abort processing of the dictated material by the transcription device if the automatically transcribed text data (ATTI) contains a number exceeding an error threshold of recognition errors per N words of the automatically transcribed text data (ATTI).

7. A transcription device as claimed in claim 1, in which retransmission means are provided which are designed to retransmit the received audio data (AI) after processing of the dictated material by the transcription device has been aborted, in order to allow manual transcription of the dictated material.

8. A transcription method for the automatic transcription of dictated material, in which the following steps are executed:
- reception of dictated audio data (AI);
- conversion of the received audio data (AI) into automatically transcribed text data (ATTI);
- output of the automatically transcribed text data (ATTI);
- abortion of processing of the dictated material if the automatically transcribed text data (ATTI) produced during automatic transcription would be or already is of poor quality with a relatively large number of recognition errors.

9. A transcription method as claimed in claim 8, in which the following further steps are executed:
- checking of the quality of the received audio data (AI) for downstream speech recognition in which the signal-to-noise ratio of an audio signal containing the received audio data (AI) is checked;
- abortion of processing of the dictated material if the quality of the received audio data (AI) does not allow successful automatic transcription.

10. A transcription method as claimed in claim 8, in which the following further steps are executed:
- checking of the quality of the received audio data (AI) for downstream speech recognition in which the level of the audio signal containing the received audio data (AI) is checked;
- abortion of processing of the dictated material if the quality of the received audio data (AI) does not allow successful automatic transcription.

11. A transcription method as claimed in claim 8, in which the following further steps are executed:
- checking of the quality of the automatically transcribed text data (ATTI);
- abortion of processing of the dictated material if the automatically transcribed text data contains a number exceeding an error threshold of recognition errors per N words of the automatically transcribed text data (ATTI).

12. A transcription method as claimed in claim 8, in which the following further steps are executed:
- retransmission of the received audio data (AI), in order to allow manual transcription of the dictated material if processing of the dictated material has been aborted.

13. A computer readable medium, which may be loaded directly into the internal memory of a digital computer and comprises software code sections, causing said digital computer to execute the steps of the transcription method as claimed in claim 8 are executed by the computer if the product is running on the computer.

14. A computer program product as claimed in claim 13, in which the following further steps are executed:
- checking of the quality of the received audio data (AI) for downstream speech recognition in which the signal-to-noise ratio of an audio signal containing the received audio data (AI) is checked;
- abortion of processing of the dictated material if the quality of the received audio data (AI) does not allow successful automatic transcription.

* * * * *